(12) United States Patent
Mekid

(10) Patent No.: US 8,705,019 B2
(45) Date of Patent: Apr. 22, 2014

(54) STRUCTURAL MATERIAL WITH EMBEDDED SENSORS

(75) Inventor: Samir Mekid, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/556,143

(22) Filed: Jul. 23, 2012

(65) Prior Publication Data

US 2014/0022529 A1    Jan. 23, 2014

(51) Int. Cl.
*G01B 11/16* (2006.01)

(52) U.S. Cl.
CPC ...................................... *G01B 11/16* (2013.01)
USPC ........................................................... 356/32

(58) Field of Classification Search
CPC ....................................................... G01B 11/16
USPC ...................................................... 356/32–38
See application file for complete search history.

(56) References Cited

U.S. PATENT DOCUMENTS

| | | | |
|---|---|---|---|
| 6,518,330 B2 | 2/2003 | Moore et al. | |
| 7,702,190 B2* | 4/2010 | Hao et al. | 385/13 |
| 7,714,271 B1 | 5/2010 | Levine | |
| 7,811,666 B2 | 10/2010 | Dry | |
| 7,973,914 B2 | 7/2011 | Omichi et al. | |
| 8,240,913 B2* | 8/2012 | Zheng et al. | 374/131 |
| 8,257,991 B1* | 9/2012 | Park et al. | 438/31 |
| 2005/0232532 A1* | 10/2005 | Wang et al. | 385/13 |
| 2006/0253942 A1 | 11/2006 | Barrera et al. | |
| 2007/0258674 A1* | 11/2007 | Wang et al. | 385/13 |
| 2008/0013879 A1* | 1/2008 | Mossman | 385/13 |
| 2009/0208684 A1 | 8/2009 | Dunleavy et al. | |
| 2010/0042557 A1* | 2/2010 | Block et al. | 705/500 |
| 2010/0119704 A1 | 5/2010 | Hemmelgarn et al. | |
| 2010/0183258 A1* | 7/2010 | Chow et al. | 385/12 |
| 2011/0023611 A1 | 2/2011 | Jones et al. | |
| 2011/0118385 A1 | 5/2011 | Guadagno et al. | |
| 2012/0186337 A1* | 7/2012 | Guichard et al. | 73/204.23 |
| 2012/0321242 A1* | 12/2012 | Schade et al. | 385/12 |

FOREIGN PATENT DOCUMENTS

WO    WO 2009/113025 A1    9/2009

* cited by examiner

*Primary Examiner* — Michael P Stafira
(74) *Attorney, Agent, or Firm* — Richard C Litman

(57) ABSTRACT

The structural material with embedded sensors provides of diagnostics and measurement of static and/or dynamic strains in structures and structural elements formed from the structural material. The structural material includes an array of fiber Bragg grating sensors or the like embedded therein for strain measurement and monitoring. An array of linear channels is formed in the structural element, and the plurality of fiber Bragg grating sensors are respectively disposed therein. The plurality of fiber Bragg grating sensors communicate with a signal analyzer, which receives the signals generated by the fiber Bragg grating sensors, the signals being representative of a magnitude of a strain placed on the structural element. The signal analyzer may, in turn, transmit a conditioned signal to a computer or the like for presentation of strain data to the user.

5 Claims, 5 Drawing Sheets

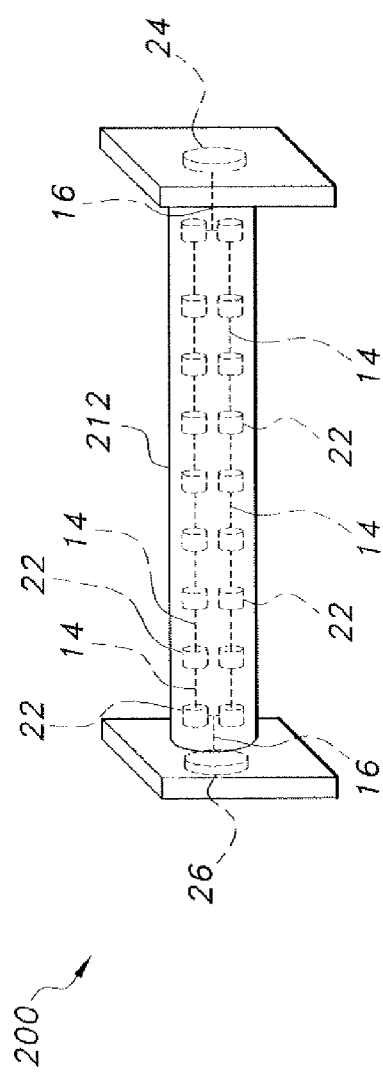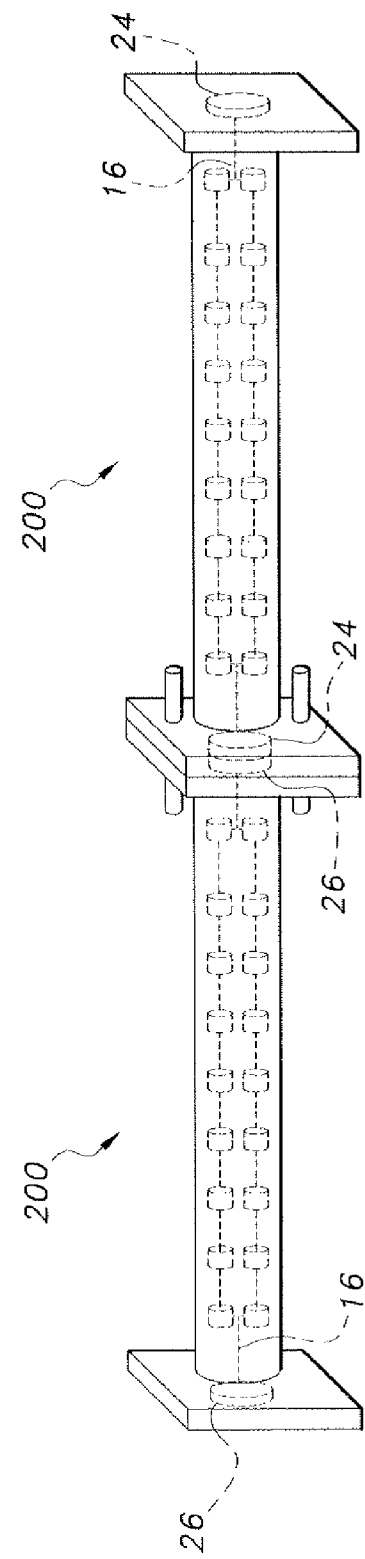

STRUCTURAL MATERIAL WITH EMBEDDED SENSORS

BACKGROUND OF THE INVENTION

1. Field of the Invention

The present invention relates to diagnostics and measurement of static and/or dynamic strains in structures, structural elements and structural materials, and particularly to a structural material with embedded sensors, the sensors being fiber Bragg grating sensors embedded in the structural material for strain measurement.

2. Description of the Related Art

There is an ever present need to provide either service monitoring of safety-critical components and structures or to optimize their usage, particularly if the structures or components are fabricated of composite materials. This need is particularly critical in the field of structures and components utilized for aerospace, naval and railway applications, and in the construction field (e.g. bridges, viaducts, oil ducts, offshore platforms, etc.). In such applications, the diagnostics need is paralleled by a requirement for reliable, miniaturized, portable monitoring systems.

Conventional sensors for measuring stress and strain that are formed from piezoelectric materials, magnetic materials or the like are typically relatively bulky and are susceptible to damage, or at least to interference from environmental conditions, such as temperature variations, electromagnetic fields and the like.

Optical sensors that are either attached to the component surface (i.e., the structure) to be monitored or embedded, where possible, are particularly suitable for such applications. Each of the above applications can benefit from the small, durable, long-lived, electromagnetically immune capabilities of optical fibers to implement the optical sensing function. Conventional optical sensors, however, are typically used in conjunction with other sensors, or are combined with other monitoring elements that also suffer from the above problems. It would be desirable to provide a purely optical sensor on or in the structural element to be monitored.

Thus, a structural material with embedded sensors solving the aforementioned problems is desired.

SUMMARY OF THE INVENTION

The structural material with embedded sensors provides diagnostics and measurement of static and/or dynamic strains in structures and structural elements formed from the structural material. The structural material includes an array of fiber Bragg grating sensors or the like embedded therein for strain measurement and monitoring. An array of linear channels is formed in the structural element, and the plurality of fiber Bragg grating sensors are disposed in the channels. The plurality of fiber Bragg grating sensors communicate with a signal analyzer, which receives the signals generated by the fiber Bragg grating sensors, the signals being representative of a magnitude of a strain placed on the structural element. The signal analyzer may, in turn, transmit a conditioned signal to a computer or the like for presentation of strain data to the user.

These and other features of the present invention will become readily apparent upon further review of the following specification and drawings.

BRIEF DESCRIPTION OF THE DRAWINGS

FIG. 3A is a perspective view of another alternative embodiment of structural material with embedded sensors according to the present invention, in which the material is formed as a structural beam.

FIG. 3B is a perspective view illustrating a pair of the structural beams of FIG. 3A joined together.

Similar reference characters denote corresponding features consistently throughout the attached drawings.

DETAILED DESCRIPTION OF THE PREFERRED EMBODIMENTS

Figure 1:
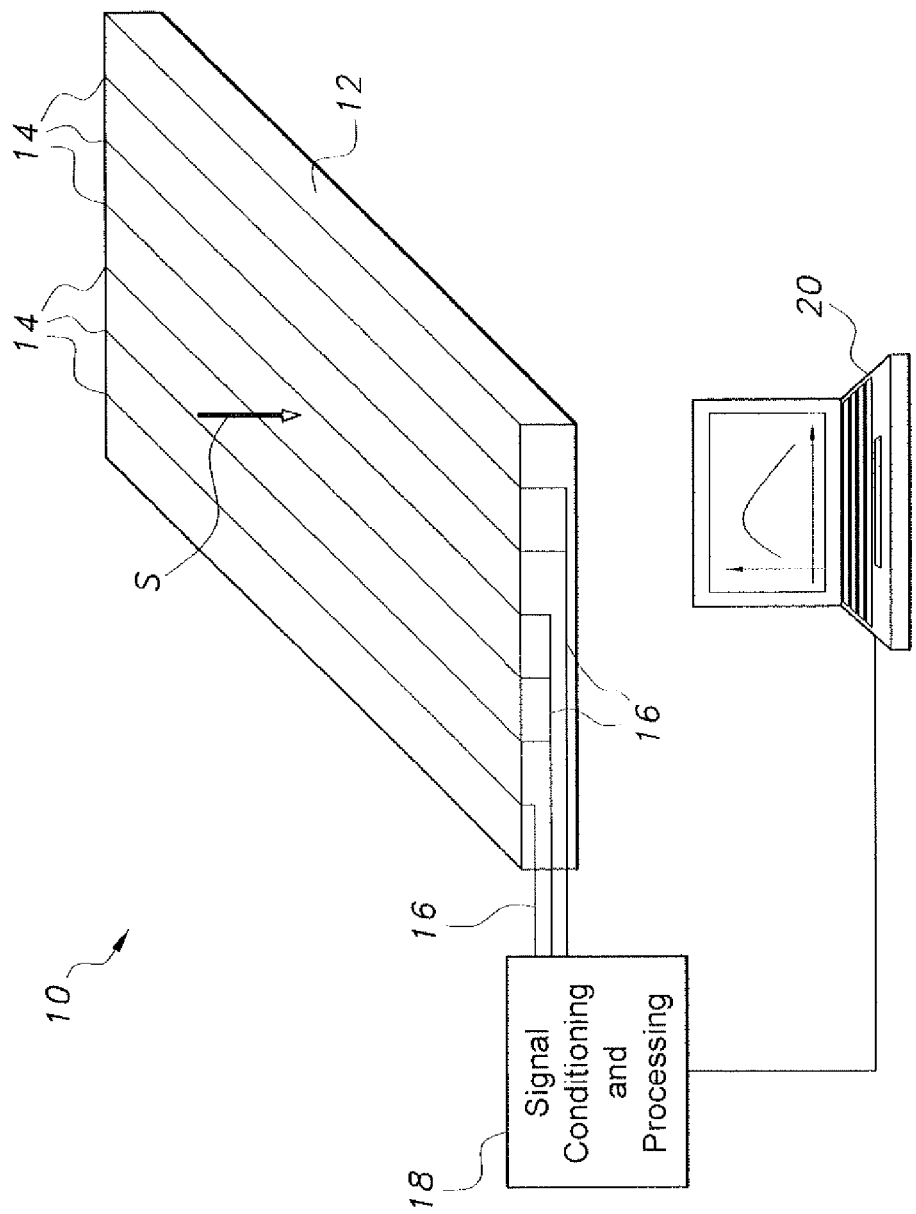
FIG. 1 is an environmental perspective view of a system incorporating structural material with embedded sensors according to the present invention to monitor for potential failure of the structural material.

The structural material with embedded sensors provides diagnostics and measurement of static and/or dynamic strains in structures and structural elements formed from the structural material. FIG. 1 shows a first embodiment of the structural material with embedded sensors, designated generally as 10 in the drawing. As shown in FIG. 1, the structural material 12 (shown in the drawing as an exemplary planar structural element, such as a wall or strut) includes an array of fiber Bragg grating sensors 14 or the like embedded therein for strain measurement and monitoring. The material 12 may be a metal, composite material or any other desired material used for structures and structural elements.

When a stress or strain S is applied to the structural material 12, a measurement of the magnitude of strain S is measured by the array of fiber Bragg grating sensors 14, and may also be located by comparison of strain magnitudes measured by individual sensors 14. In the preferred embodiment, the sensors 14 are fiber Bragg grating sensors, although it should be understood that any suitable type of optical fiber sensors may be utilized.

A fiber Bragg grating (FBG) is a type of distributed Bragg reflector constructed in a short segment of optical fiber that reflects particular wavelengths of light and transmits all others. This is achieved by creating a periodic variation in the refractive index of the fiber core, which generates a wavelength specific dielectric mirror. A fiber Bragg grating can therefore be used as an inline optical filter to block certain wavelengths, or as a wavelength-specific reflector.

As well as being sensitive to strain, the Bragg wavelength is also sensitive to temperature. This means that fiber Bragg gratings can be used as sensing elements in optical fiber sensors. In an FBG sensor, the measurand causes a shift in the Bragg wavelength, $\Delta\lambda_B$. The relative shift in the Bragg wavelength, $\Delta\lambda_B/\lambda_B$, due to an applied strains and a change in temperature $\Delta T$ is approximately given by $\Delta\lambda_B/\lambda_B = C_S \in + C_T \Delta T$, or $\Delta\lambda/\lambda_B = (1-p_e)\in + (\alpha_A + \alpha_H)\Delta T$, where $C_S$ is the coefficient of strain, which is related to the strain optic coefficient $p_e$, $C_T$ is the coefficient of temperature, which is made up of the thermal expansion coefficient of the optical fiber, $\alpha_\Lambda$, and the thermo-optic coefficient, $\alpha_n$. Thus, fiber Bragg gratings can then be used as direct sensing elements for strain and temperature. Fiber Bragg grating sensors for measuring strain are well known in the art. Examples of such are shown in U.S. Pat. Nos. 7,702,190; 7,714,271; and 7,973,914, each of which is hereby incorporated by reference in its entirety.

As shown in FIG. 1, the fiber Bragg grating sensors 14 are preferably aligned in a parallel, evenly spaced configuration in the structural material 12, although it should be understood that any suitable array configuration may be utilized, depending upon the particular type, dimensions and configuration of the material 12. The fiber Bragg grating sensors 14 generate signals representative of the measured magnitude of strain S, and these signals are transmitted through leads 16, also preferably at least partially embedded within the material 12, for signal conditioning and processing by a signal analyzer 18. The signal analyzer 18 may be any suitable type of signal analyzer or signal conditioner/processor, as is known in the art. Once conditioned, the signal is fed to a computer 20 for presentation to the user in a desired data format, such as the graphical display illustrated in FIG. 1.

Figure 2A:
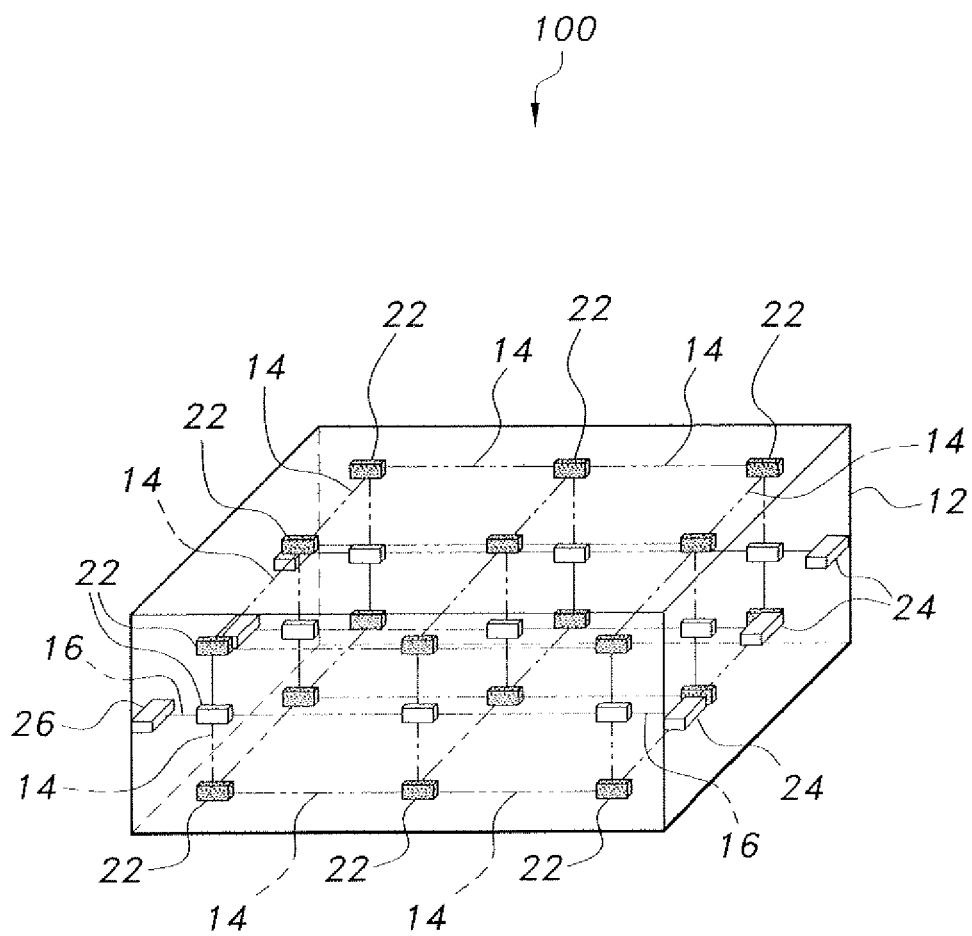
FIG. 2A is a diagrammatic perspective view of an alternative embodiment of a structural material with embedded sensors according to the present invention that utilizes a three-dimensional array of embedded sensors to form a structural block.

FIG. 1 illustrates a relatively simple planar array of fiber Bragg grating sensors 14 for purposes of illustration. FIG. 2A shows a more complex three-dimensional array that may be used in construction blocks 100 or the like. The fiber Bragg grating sensors 14 in FIG. 2A may be viewed as vertical "slices" embedded within the structural material 12. In other words, in the configuration illustrated in FIG. 2A, three such vertical planar arrays, similar to the planar array of FIG. 1, form the overall three-dimensional array. The first vertical plane or "slice" of fiber Bragg grating sensors 14 is shown towards the front in FIG. 2A. Each fiber sensor 14 extends between a pair of junctions 22. For each vertical plane of sensors, this allows the fiber sensors 14 to extend both vertically and horizontally (in the orientation of FIG. 2A), forming a 2-dimensional grid. Each planar "slice" of sensors 14 and the respective junctions 22 are in communication with a single node 24, preferably embedded in one end of the structural element 12, as shown. Formed on the opposite end is a transceiver 26. The leads 16 from each junction 22 transmit the measured strain signals to both nodes 24 and transceivers 26.

Figure 2B:
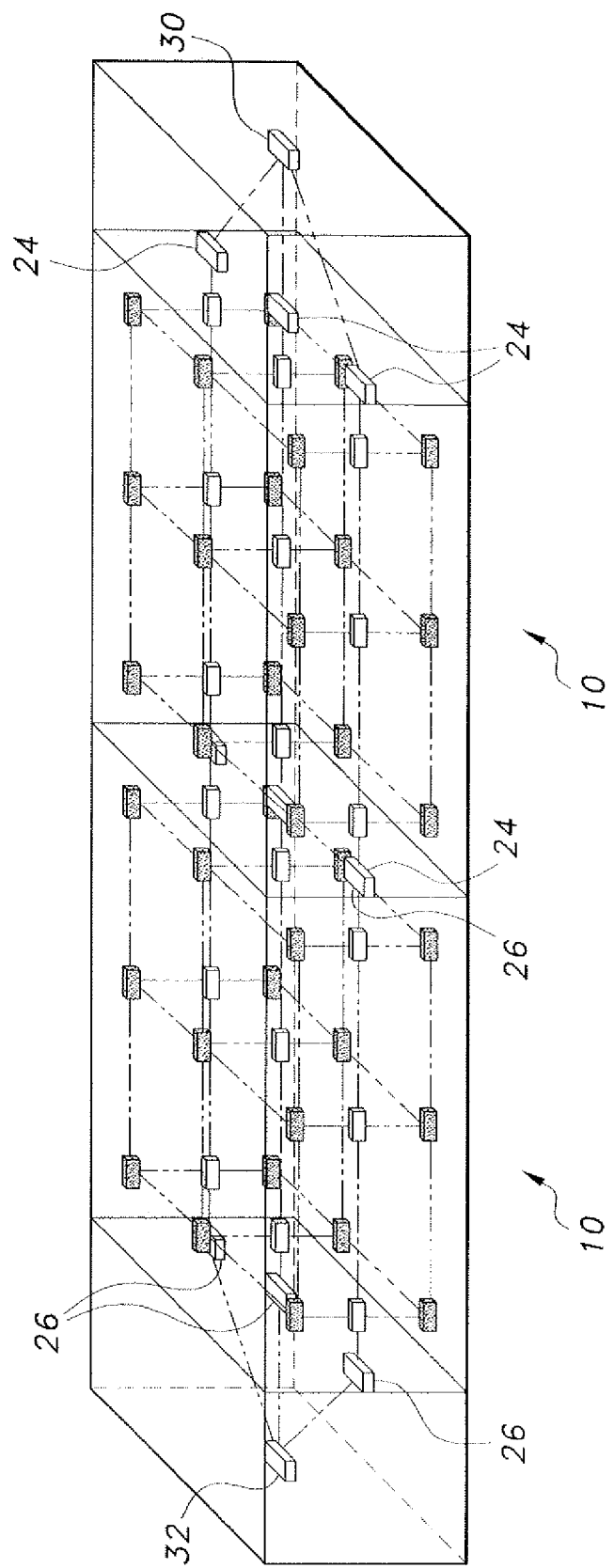
FIG. 2B is a diagrammatic perspective view illustrating a pair of the structural blocks of FIG. 2A joined together.

As shown in FIG. 2B, multiple such structural elements 100 may be joined together. For example, for construction blocks, the construction blocks 100 may be placed together in a conventional manner. However, nodes 24 also serve as ports for linking to respective transceivers 26 of the adjacent block. At one end of the overall structure, the non-ported, or free, nodes 24 may communicate with a terminal node 30 through wireless transmission or the like. At the other end, the non-ported or free transceivers 26 communicate with a terminal transceiver 32 through wireless transmission or the like, and the terminal transceiver 32 transmits the measured signals to the signal analyzer 18 (of FIG. 1) for conditioning and processing, as described above.

FIG. 3A shows a further alternative embodiment in which structural material 212 forms a beam 200 or the like. In such a configuration, the fiber Bragg grating sensors 14 are arrayed linearly, as in FIG. 1, with only a single "slice" (referring to the embodiment of FIG. 2A) of the fiber Bragg grating sensors 14 being used within the beam. As in the block 100 of FIG. 2A, each fiber sensor 14 extends between a pair of junctions 22, and each linear arrangement of sensors 14 and the respective junctions 22 are in communication with a node 24, preferably embedded in one end of the beam 212, as shown. Formed on the opposite end is a transceiver 26. The leads 16 from each junction 22 transmit the measured strain signals to both the node 24 and the transceiver 26.

As shown in FIG. 3B, multiple such structural beams 200 may be joined together. As shown, the structural beams 200 may be placed together in a conventional manner. However, the nodes 24 also serve as ports for linking to respective transceivers 26 of the adjacent beam. At one end of the overall structure, the non-ported or free node 24 may communicate with an external terminal node through wireless transmission or the like, as described above with regard to the structural block 100. Similarly, at the other end, the non-ported or free transceiver 26 may communicate with an external terminal transceiver through wireless transmission or the like, and the terminal transceiver will then transmit the measured signals to the signal analyzer 18 (of FIG. 1) for conditioning and processing, as described above. In FIGS. 3A and 3B, two linear arrangements of fiber sensors 14 are shown embedded within the beam 212, although it should be understood that any desired number of linear arrangements may be embedded therein, each linear arrangement feeding into the single node 24 at one end, and into the transceiver 26 at the other end.

Figure 4B:
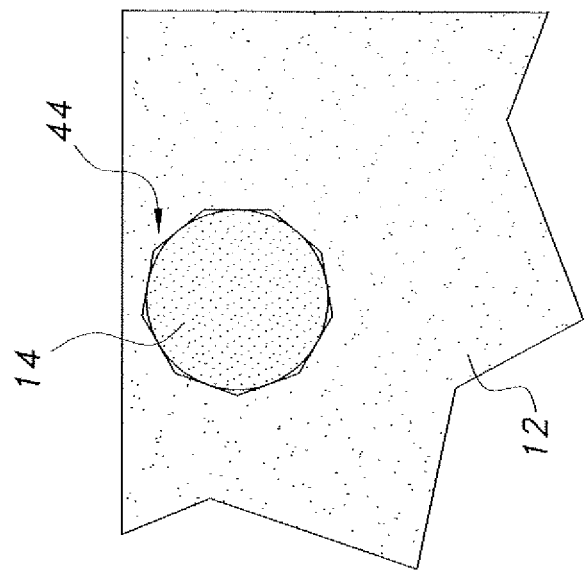
FIG. 4B is a partial side view in section of structural material with embedded sensors according to the present invention, illustrating an alternative method of embedding the fiber sensor in the structural material.
Figure 4A:
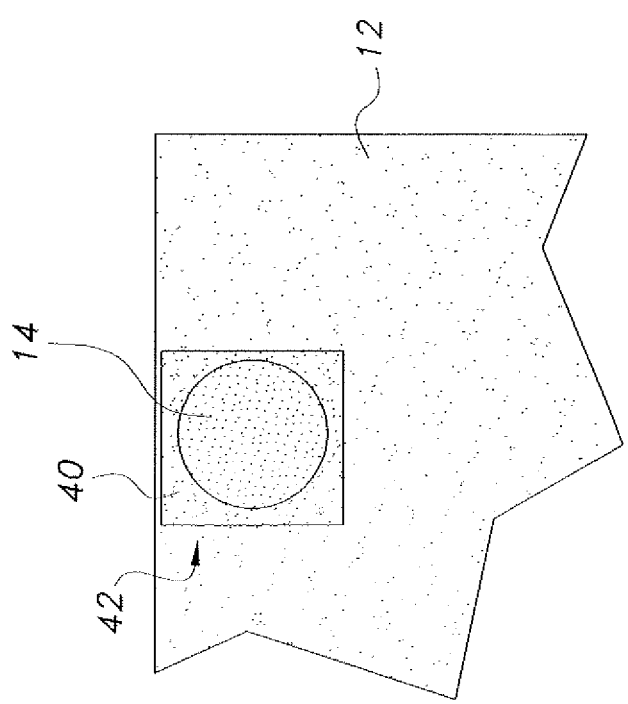
FIG. 4A is a partial side view in section of structural material with embedded sensors according to the present invention, illustrating a single fiber sensor embedded in the structural material.

FIG. 4A illustrates the formation of the structural material with embedded sensors 100. As shown in FIG. 4A, a channel 42 is formed in the surface of structural material 12, and the fiber sensor 14 is held therein by an outer layer 40 of glue, resin, or the like. Although shown as a rectangular channel 42, it should be understood that the channel 42 may have any suitable shape. Preferably, the width and height of the channel 42 are only slightly greater than the diameter of the fiber sensor 14. In FIG. 4B, the channel 44 has been formed through an ultrasonic machining method, as is known in the art. The fiber 14 is held by an ultrasonically vibrating tool and then pushed into the material 12 so that the high frequency vibrating penetration of the fiber 14 creates the channel 44. It should be understood that fiber sensors 14 may be embedded within the structural material 12 by any suitable method.

As a further alternative, actuators may also be embedded within the material 12. In response to a detected strain S above a threshold value, piezoelectric actuators or the like may be externally actuated to flex or the move the material to counter the strain S.

It is to be understood that the present invention is not limited to the embodiments described above, but encompasses any and all embodiments within the scope of the following claims.

I claim:

1. A structural material with embedded sensors, comprising:
   a structural element having an array of linear channels formed therethrough;
   a plurality of fiber Bragg grating sensors disposed within the array of linear channels;
   a signal analyzer in communication with the plurality of fiber Bragg grating sensors, the analyzer receiving signals generated by the fiber Bragg grating sensors representative of a magnitude of a strain on the structural element; and
   a plurality of junctions, each said fiber Bragg grating sensor extending between and communicating with a pair of the junctions, wherein said junctions are in communication with one another, said plurality of junctions and said plurality of fiber Bragg grating sensors being divided into a plurality of planar arrays, said plurality of planar arrays being stacked to define a three-dimensional array, wherein the plurality of junctions and the plurality of fiber Bragg grating sensors of each said planar array alternate with respect to vertically adjacent ones of the plurality of planar arrays.

2. The structural material with embedded sensors as recited in claim 1, further comprising a terminal node mounted on a first end of said structural element, the respective junctions of each said planar array communicating with the terminal node.

3. The structural material with embedded sensors as recited in claim 2, further comprising a terminal transceiver mounted on a second end of said structural element opposite the first end, the respective junctions of each said planar array communicating with the terminal transceiver, the terminal transceiver being in communication with said signal analyzer.

4. The structural material with embedded sensors as recited in claim 3, wherein the terminal node of the structural element selectively mates and communicates with the terminal transceiver of an adjacent structural element.

5. The structural material with embedded sensors as recited in claim 1, wherein the plurality of junctions and the plurality of fiber Bragg grating sensors of each said planar array are vertically aligned with the plurality of junctions and the plurality of fiber Bragg grating sensors of sequentially alternating ones of said planar arrays.

* * * * *